Sept. 23, 1969          E. N. MARTIN          3,468,457

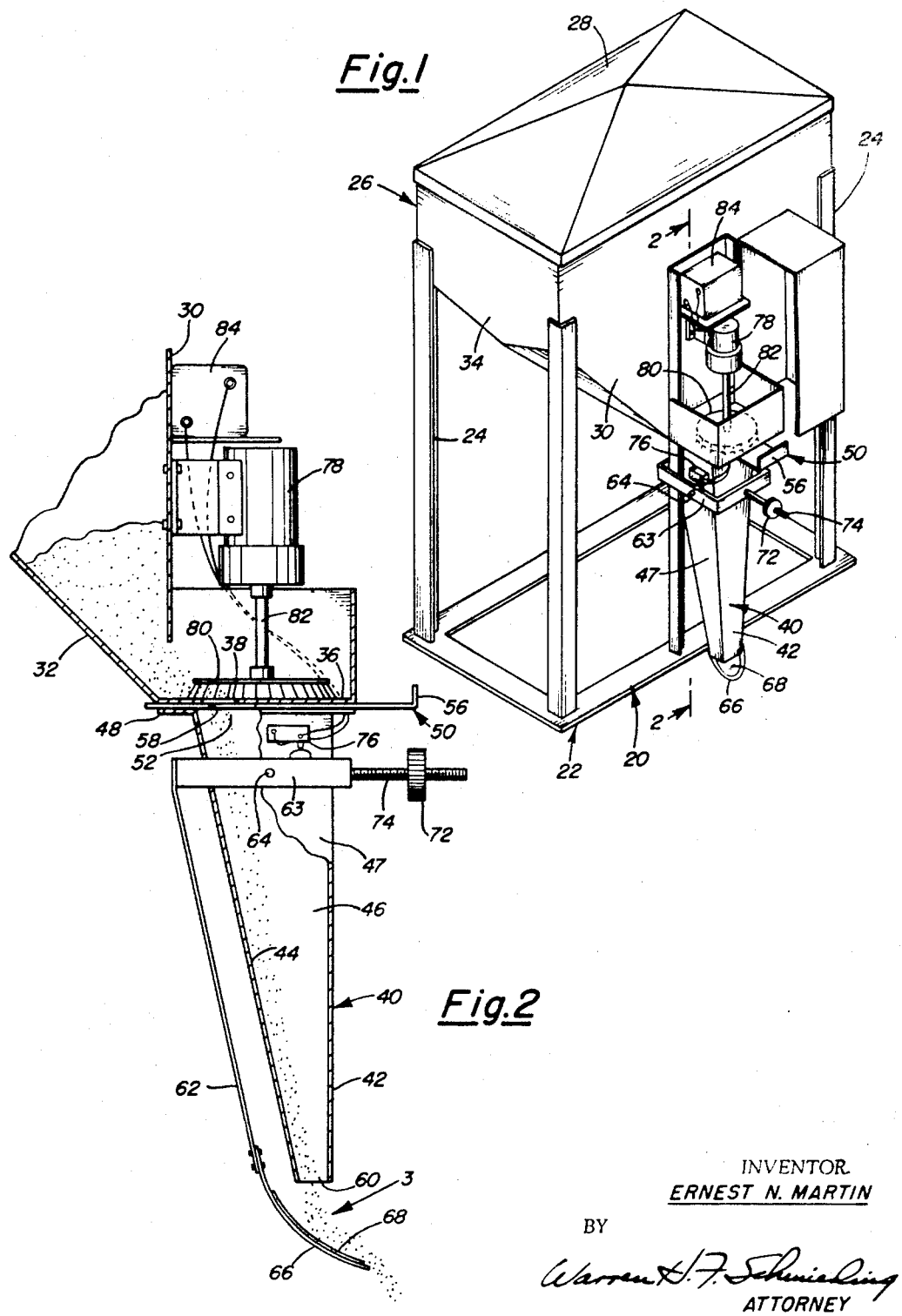

DISPENSER FOR FERTILIZER

Filed Dec. 18, 1967                        2 Sheets-Sheet 2

INVENTOR.
ERNEST N. MARTIN
BY
ATTORNEY

United States Patent Office 3,468,457
Patented Sept. 23, 1969

3,468,457
DISPENSER FOR FERTILIZER
Ernest N. Martin, 1141 High St.,
Escondido, Calif. 92025
Filed Dec. 18, 1967, Ser. No. 691,255
Int. Cl. B67d 5/08; B65d 47/00
U.S. Cl. 222—55                                6 Claims

ABSTRACT OF THE DISCLOSURE

A dispensing apparatus for material, such as granular fertilizer, some of which are irregular in configuration. The apparatus comprises a hopper having a controlled outlet leading to a chute. The material flowing from the outlet of the chute is subjected to a sensing device which controls the operation of a wiper at the outlet of the hopper to prevent clogging of the latter outlet.

BACKGROUND OF THE INVENTION

Field of the invention

The present invention is directed to maintaining a constant quantity flow of a material having irregular configurations, such as lumps in granular fertilizer.

SUMMARY OF THE INVENTION

The dispensing apparatus of the present invention comprises a hopper having an outlet which is adjustable, in area, to control the quantity of flow therethrough. The outlet leads to the inlet of a chute, and a flow sensing device at the outlet of the chute control mechanism for preventing clogging of the outlet of the hopper.

The sensing device is in the form of a taut membrane which is pivotally movable for controlling a motor actuated wiper, which wiper removes lumps of fertilizer from the outlet of the hopper to thereby prevent clogging and prevent irregular quantity flow through the outlet.

Other features and the advantages of the present invention will be apparent from the following description, reference being had to the accompanying drawings wherein a preferred embodiment of the invention is illustrated.

BRIEF DESCRIPTION OF THE DRAWINGS

FIG. 1 is a perspective view of the dispensing apparatus;

FIG. 2 is a view, partly in section, the section being taken along line 2—2 of FIG. 1, but on a larger scale;

DESCRIPTION OF THE PREFERRED EMBODIMENT

Figure 3:
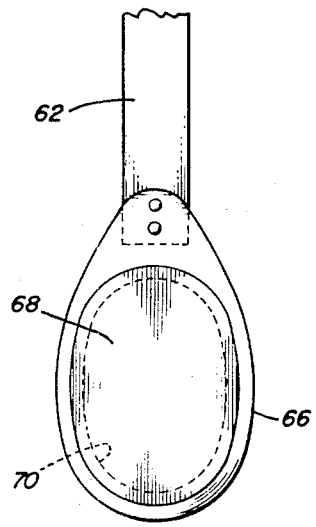
FIG. 3 is a view of the sensing device, looking in the direction of arrow 3 of FIG. 2.

Referring more in detail to the drawings, the dispensing apparatus 20 includes a frame 22 which includes supporting legs 24. The frame legs carry a container in the form of a hopper 26 having a loose fitting cover 28. The hopper includes a front wall 30, a rear wall 32, like side walls, one of which latter is shown at 34 and a bottom wall 36. The lower portions of the rear and side walls slope inwardly toward the bottom wall. The bottom wall is provided with a circular opening 38 for the egress of material from the hopper.

A chute 40 includes a front wall 42, a rear wall 44, side walls 46 and 47, and flanges 48 extending outwardly from the upper ends of the walls. These flanges are suitably fixed to the bottom wall 36 of the hopper but are spaced from the bottom wall 36 for slidably receiving a gauge 50, shown in detail in FIG. 3. The upper end of the chute is open as at 52, and registers with the opening 38 in the bottom wall of the hopper.

Figure 4:
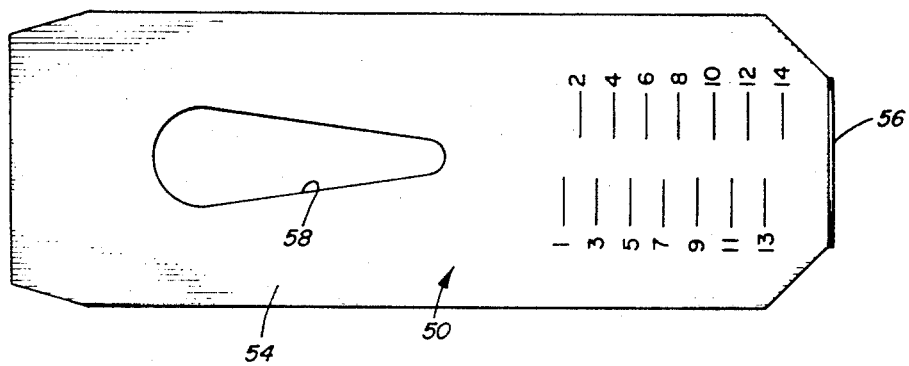
FIG. 4 is a plan view of the gauge, but on a larger scale.

The gauge 50 includes a flat plate 54 and a handle section 56 for manipulating the same. The plate is provided with an opening 58 which is tapered to increase in size from left to right, as viewed in FIG. 4. This opening 58 registers with the opening 38 in the bottom wall 36 of the hopper. It is provided also with lines and numerals to indicate the position of the opening 58 with respect to the opening 38 in the bottom wall of the hopper. The largest cross width of the opening 58 is the same as the diameter of opening 38 in the hopper. When the gauge 50 is in the extreme right position, maximum flow occurs, and when in the extreme left position, the flow is at a minimum value. Intermediate values of flow are attained by adjusting the position of the gauge.

Some materials, such as granular fertilizer, contain lumps which tend to clog or partially clog the outlet from the hopper, to those impeding the constancy of quantity flow from the hopper. A sensing device, sensitive to the flow of material from the outlet 60 of the chute 40 is provided for maintaining constant quantity flow of material at the outlet 60 of the chute. This sensing device is in the form of a wing or baffle 62, which is carried by a lever 63, the lever being suitably pivoted by a pin 64 on the side wall 47 of the chute. The lower portion 66 of the baffle is disposed below the outlet 60 of the chute and is in the path of material dropping out of the chute. A membrane in the form of taut Teflon 68 spans an opening 70 in the baffle portion 66. The membrane 68 is sufficiently taut so that the granular materially striking it will bounce from it whereby no granulars will adhere to it.

The baffle 62 is counterbalanced by a weight 72 which is threaded onto a threaded stud 74 on the lever 63. In this manner the lever is highly sensitive to changes in quantity of flow of material from the outlet of the chute.

An electric controller in the form of a switch 76 is adapted to be opened and closed by the movement of the baffle 62 through the lever 63. A motor 78 is controlled by the switch 76. A wiper in the form of a brush 80 is rotated by the motor shaft 82. The circuit for the motor 78 includes a battery 84, the motor and switch 76.

MODE OF OPERATION

The material in the hopper 26 flow by gravity out of the opening 38 in the bottom wall 36 of the hopper, through the gauge opening 58 in gauge 50 and into the chute 40. The material, in dropping out of the outlet 60 of the chute, at the proper quantity of flow, strikes the membrane 68 with sufficient force to overbalance the counterweight 72 and thereby maintains the switch 76 open. However, should a lump or lumps of material restrict the flow of material at the outlet 38 of the hopper or in the opening 58 in gauge 50, the flow of material onto the membrane will be lessened with the result of the counterweight overcoming the baffle 62 to close the switch 76, whereby the brush 80 will rotate to wipe away the lumps and also such wiping breaks the lumps so that they readily pass through the valve opening 58.

The counterweight 72 is adjustable on stud 74 so as to vary the counterweight's effectiveness commensurate with the adjusted quantitive flow of material out of the chute 40.

The present invention, among many other uses, is particularly useful in supplying fertilizer to a water main or channel leading to furrows. It is portable so that it can be moved readily by one person from one main or channel to other mains or channels. Being highly sensitive to quantity flow, the amount of fertilizer dispensed can be varied in direct accordance with the amount of water being distributed.

I claim:

1. A dispensing apparatus for material having irregularity in configuration such as undesirable lumps, said dispenser comprising:
   (A) an upper container having:
      (1) an outlet at the bottom thereof;
   (B) a stationary chute below the container having:
      (1) an inlet below and registering with the outlet of the container;
      (2) an outlet below the inlet;
   (C) a wiper adjacent the inlet to the chute for moving lumps of the material laterally with respect to the inlet to the chute;
   (D) means for moving the wiper when lumps of the material accumulate at the outlet of the container, said means including:
      (1) an electric motor,
      (2) a switch for rendering the motor operative and inoperative;
      (3) a movable material flow sensing device at the outlet of the chute, said device being movable in response to a flow of material, below a predetermined normal quantity flow, from the outlet of the chute for closing the switch, and movable in response to a flow at least equal to said predetermined quantity for opening the switch.

2. A dispensing apparatus as defined in claim 1, characterized in that the sensing device comprises a pivotally mounted vane lying in the path of material flowing from the outlet of the chute.

3. A dispensing apparatus as defined in claim 2 characterized in that the vane is a taut membrane disposed in the path of material dropping from the outlet of the chute.

4. A dispensing apparatus as defined in claim 1, characterized in that the wiper also functions as a means for breaking lumps of the material.

5. A dispensing apparatus as defined in claim 1, characterized in that the wiper is rotated by the motor on a vertically extending axis.

6. A dispensing apparatus as defined in claim 1, characterized in that the container includes:
   (A) (2) a wall sloping downwardly and toward the outlet.

References Cited

UNITED STATES PATENTS

| | | | |
|---|---|---|---|
| 459,922 | 9/1891 | Baugh | 222—561 XR |
| 1,137,683 | 4/1915 | White | 222—561 XR |
| 1,172,005 | 2/1916 | Butterfield | 222—486 XR |
| 1,850,179 | 3/1932 | Merchen | 222—55 |
| 2,286,554 | 6/1942 | Lieberman | 222—55 |
| 2,626,083 | 1/1953 | Masters | 222—561 XR |
| 2,658,644 | 11/1953 | Lowe | 222—52 |
| 2,872,074 | 2/1959 | Birtwell et al. | 222—55 |
| 2,889,959 | 6/1959 | Landgraf | 222—236 XR |
| 3,036,737 | 5/1962 | King et al. | 222—55 |
| 3,254,729 | 6/1966 | Behlen | 222—55 XR |

WALTER SOBIN, Primary Examiner

U.S. Cl. X.R.

222—410, 561